Figure 1:
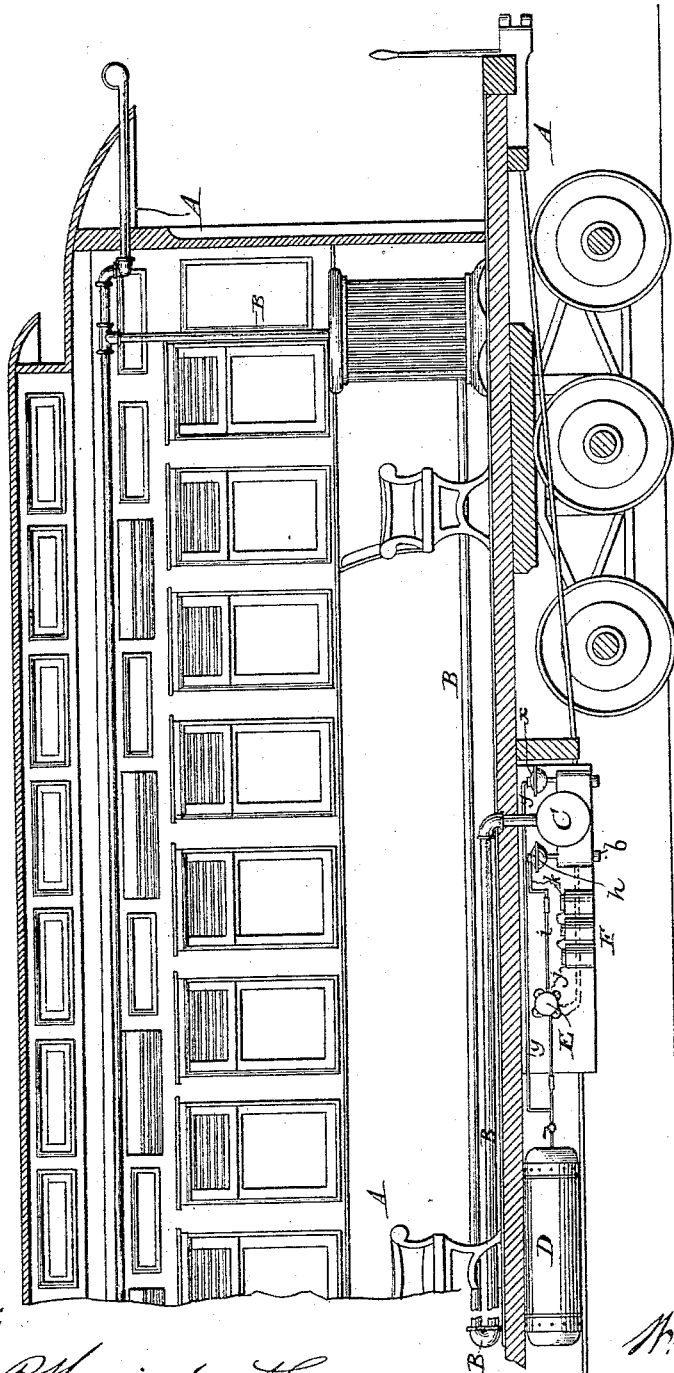

(No Model.) 4 Sheets—Sheet 1.

W. S. JOHNSON.
STEAM TRAP.

No. 399,198. Patented Mar. 5, 1889.

Attest:
Sidney P. Hollingsworth
N. A. Kennedy

Inventor:
W. S. Johnson
By P. T. Dodge
Atty

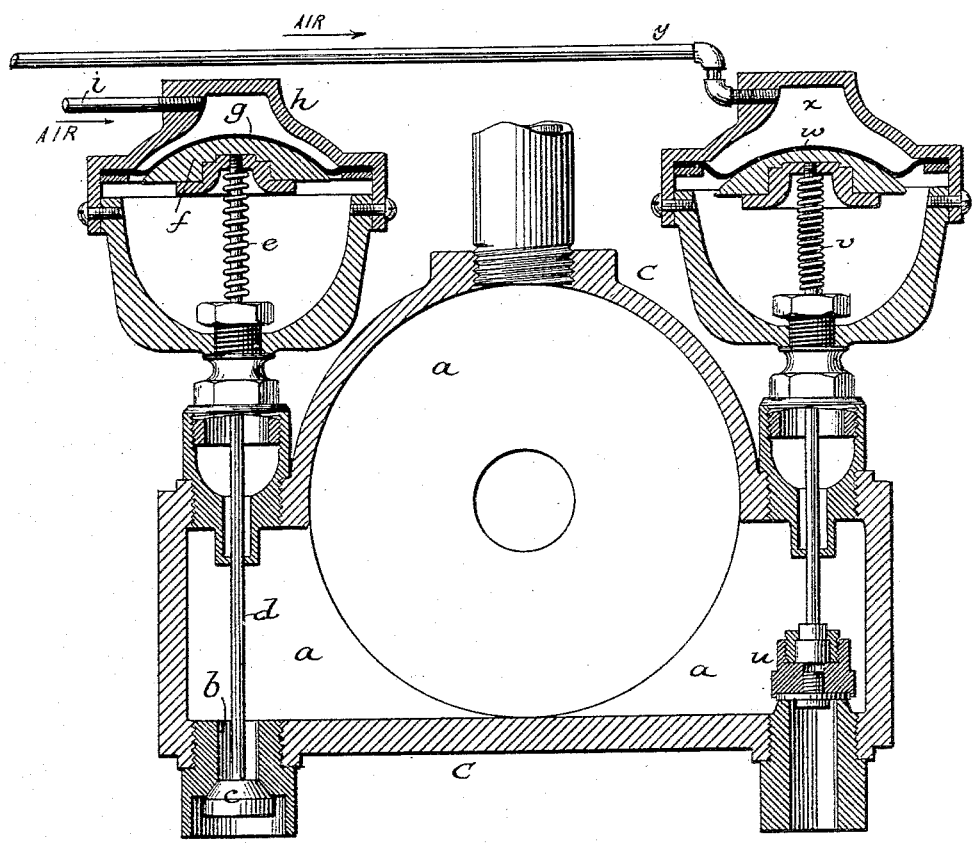

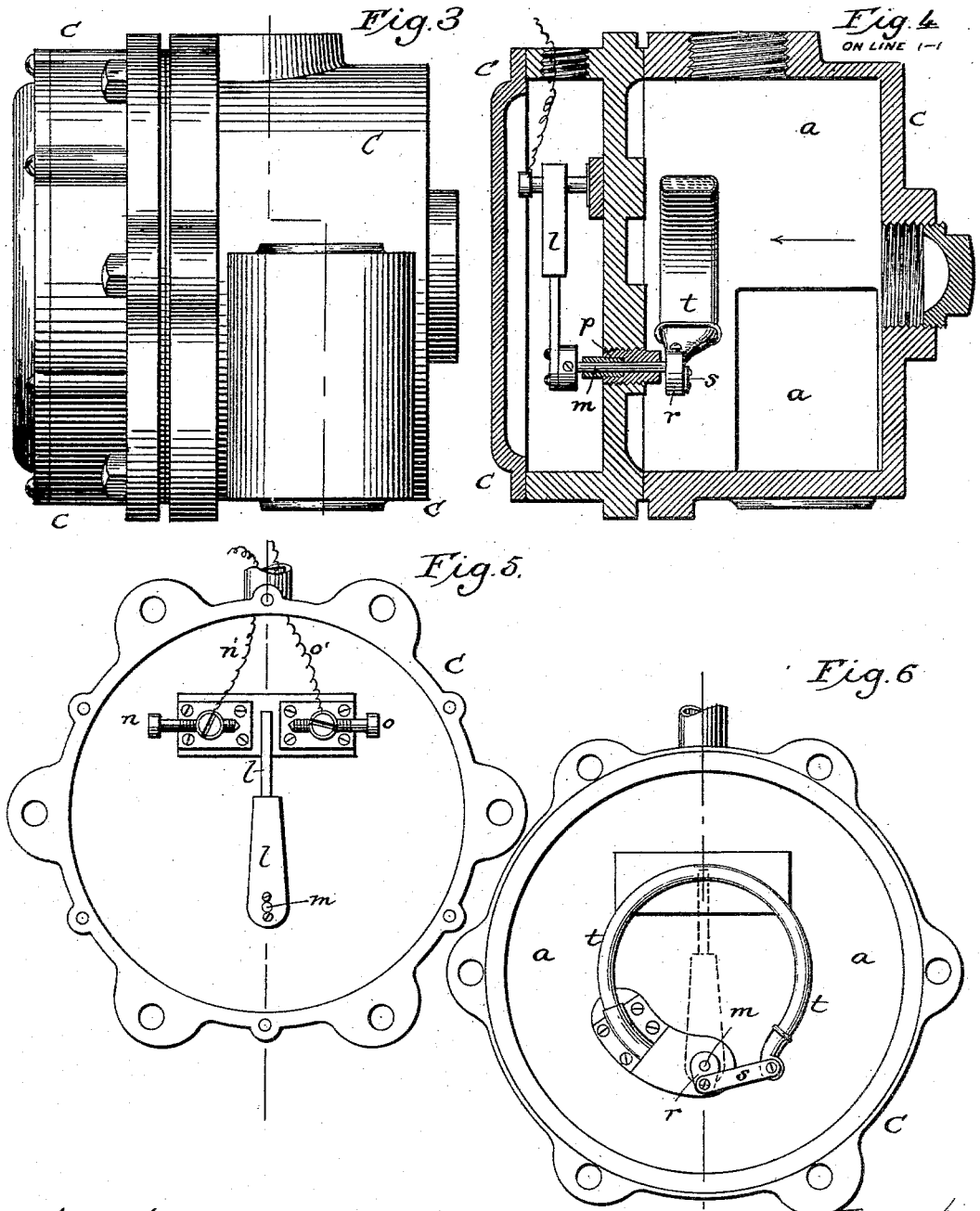

(No Model.) 4 Sheets—Sheet 4.
W. S. JOHNSON.
STEAM TRAP.
No. 399,198. Patented Mar. 5, 1889.
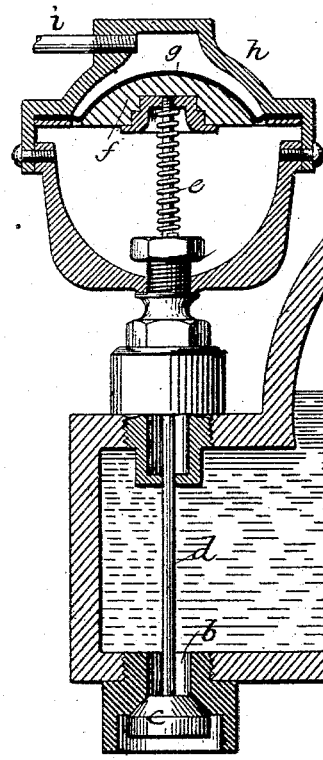
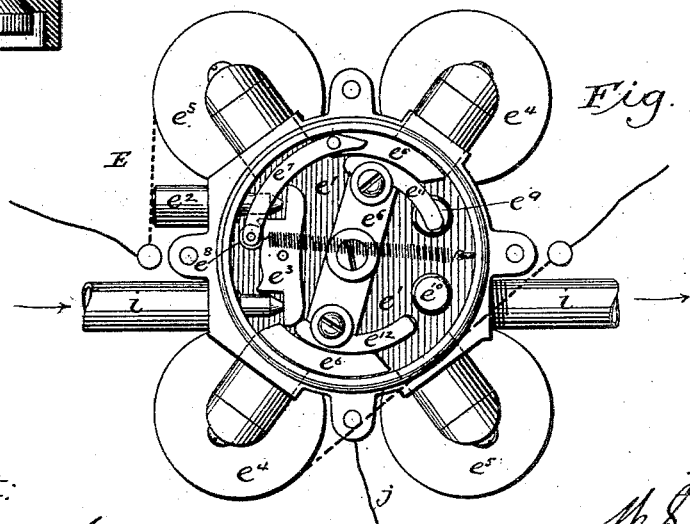
Attest:
Sidney P. Hollingsworth
N. A. Kennedy
Inventor:
W. S. Johnson
By O. T. Dodge
Atty

UNITED STATES PATENT OFFICE.

WARREN S. JOHNSON, OF MILWAUKEE, WISCONSIN.

STEAM-TRAP.

SPECIFICATION forming part of Letters Patent No. 399,198, dated March 5, 1889.

Application filed April 3, 1888. Serial No. 269,499. (No model.)

*To all whom it may concern:*

Be it known that I, WARREN S. JOHNSON, of Milwaukee, in the county of Milwaukee and State of Wisconsin, have invented certain Improvements in Steam-Traps, of which the following is a specification.

The aim of my invention is to provide an automatic steam-trap in which the opening and closing of the water-delivery valve shall be positively effected by power applied from an external source, the application of this power being electrically controlled through the medium of devices acted upon by the water accumulated within the trap. To this end I provide my trap with a discharge-valve connected to an expansion-chamber—that is to say, to a chamber having one wall formed of flexible material—or by a moving piston I connect this expansion-chamber with a source of constant fluid-pressure supply—such, for example, as a reservoir of compressed air. I control the delivery of this compressed air or equivalent fluid to the expansion-chamber which operates the discharge-valve by means of an electrically-actuated valve. This electric valve I mount in an operating or controlling circuit which is opened and closed by a suitable switch. The switch is connected to and operated by a device the action of which is effected by the water accumulated within the chamber. This switch-operating device, the details of which are not of the essence of my invention, may be variously constructed. It may be, for example, a float to be operated by the rise and fall of the water, or it may be a thermostatic device located within the water-chamber in position to be acted upon and operated by the rising water, the temperature of which is in practice appreciably lower than that of the steam, or it may be otherwise constructed in various ways which will be apparent to the skilled electrician, the only requirement in this regard being that the device shall be of such character as to be operated by the accumulated water.

In connection with my trap I propose to employ a second valve, also operated by an expansion-chamber constantly connected with a source of fluid-supply. The fluid acts to hold the valve normally in a closed position; but in the event of the fluid-supply failing from any reason, so that the system becomes inoperative, the valve is allowed to open and discharge the water from the trap, to prevent the bursting of the apparatus by the formation of ice therein in cold weather.

I propose to use my trap, among other places, in connection with steam-heating systems, and particularly the heating systems of railway-cars, and I have therefore selected the same for illustration in the drawings.

In the accompanying drawings, Figure 1 represents a longitudinal vertical section through one end of a railway-car with an ordinary steam-heating apparatus connected to my trap. Fig. 2 is a longitudinal vertical section through my trap. Fig. 3 is an end elevation of the trap. Fig. 4 is a vertical cross-section of the same on the line 1 1 of Fig. 3. Fig. 5 is a front view of the switch or circuit controlling device, its covering-plate being removed to expose it to view. Fig. 6 is an elevation of the thermostatic device operating the switch, viewed in the direction indicated by the arrow in Fig. 4. Fig. 7 is a face view showing the details of the electric valve. Fig. 8 is an elevation, partly in section, showing the trap with a float to control the switch. Fig. 9 is a section on the line 2 2 of Fig. 8.

Referring to Fig. 1, A represents the body of an ordinary railway passenger-car; B, the steam-circulating pipes mounted therein and connected with a suitable boiler of any ordinary character, and, if desired, with radiators, as usual.

C represents my trap located beneath the floor of the car and connected with the circulating-pipes in such manner that the water of condensation will drain into the trap.

D represents a cylinder or reservoir of compressed air, being in the present instance the reservoir which is commonly used in connection with the system of air-brakes, and which is at all times filled with air at high pressure.

Referring to the details of my trap, as shown in Figs. 1 to 7, $a$ represents a tight water-receiving chamber, which can be made of any desired form; $b$, a throat through which the accumulated water is discharged; $c$, an outwardly-opening valve by which the outlet-throat is closed; $d$, the valve-spindle extending upward through a gland or stuffing-box at the top of the chamber and encircled at its outer end by a spiral spring, $e$, which holds the valve normally in a closed position. The upper end of the valve-spindle is provided with an enlarged head, $f$, bearing against the under side of a flexible sheet, $g$, which forms one side or wall of a stationary chamber, $h$. The chamber $h$ and its flexible wall are closely united at the edges and suitably supported in position from the chamber or body of the trap. They jointly constitute what is known in the art as an "expansion-chamber," which is connected by a pipe, $i$, with the air-reservoir D, so that when air is admitted through this pipe to the chamber it will overcome the spring $e$, and, forcing the diaphragm $g$ downward, will open the valve $c$ and permit the water to escape from the trap.

The air-supply pipe $i$ is provided with an electric valve, E, by which the delivery of the air to the expansion-chamber is controlled. This valve may be of any suitable construction, various valves suitable for the purpose being known in the art; but I recommend the employment of the three-way valve for which Letters Patent of the United States were issued to me on the 6th day of March, 1888, No. 379,201, the construction of which is such that when turned to one position it will permit the air to pass through the pipe $i$ to the expansion-chamber, and that when turned to the opposite position it will stop the further delivery of air through the pipe and permit the air which has already passed into the expansion-chamber to recede and go to waste, so that the valve $c$ may be again closed by its spring $e$. This electric valve is also constructed, as heretofore, with automatic circuit-controlling devices, so that when it receives a momentary impulse to change its position it automatically interrupts the operating-circuit, leaves the same open, and establishes connection with a second circuit, through which it is turned at the proper time to the opposite position, as hereinafter described in detail. Adjacent to this valve I locate a voltaic battery, F, a storage-battery, or other source of constant electric supply. One terminal of the battery, $j$, is connected to the electric valve. The other terminal, $k$, is extended or connected through intermediate conductors in any suitable manner to a vibratory conducting finger or switch, $l$, mounted on a rock-shaft, $m$, and arranged to make contact alternately with two conducting-screws, $n$ and $o$, which are in turn connected by conductors $n'$ and $o'$ with the opposing magnets of the electric valve, so that the valve will be turned to one position or the other, according as the switch is turned to transmit the current through one or the other of the conductors $n'$ $o'$.

The rock-shaft $m$, which carries the switch-finger, is extended through a stuffing-box, $p$, as shown in Fig. 4, to the interior of the water-chamber, where it is connected by a crank-disk, $r$, to a link, $s$, pivoted in its turn to a curved tube, $t$, which is fixed rigidly at its opposite end and filled with a fluid adapted to expand at moderate temperatures. This sealed fluid-containing tube constitutes the thermostatic device commonly known in the art as the "Bourdon tube," and when subjected to an increase of temperature it tends to elongate or straighten, and thereby, through the intermediate connections, to throw the switch-finger into contact with the conductor $n'$.

The operation is as follows: The electric valve E is normally closed to prevent the passage of air from the reservoir D. The water-discharge valve $c$ is also normally closed, being held in its closed position by the spring $e$. The chamber of the trap is primarily filled with steam at a high temperature, which, keeping the thermostat expanded, maintains the contact of the switch with screw ends. When, however, the accumulating water, having a temperature less than that of the steam, rises sufficiently to act on the thermostatic tube, the latter contracts and throws the switch into contact with conducting-screw $o$, whereupon the electric valve E is opened, air admitted therethrough to the expansion-chamber, and the latter caused to open the valve $c$ and discharge the water. As soon as the water is discharged, the steam entering the chamber in its place expands the thermostatic tube and changes the circuit, so that the electric valve is closed and the valve $c$ permitted to close again, owing to the relief of the expansion-chamber from the air-pressure.

It is to be understood that at each movement of the valve the circuit in use at the instant is automatically interrupted and left open. Thus it is that the valve is automatically coupled to the conductors $n'$ and $o'$ alternately by the vibratory switch to move the valve to and fro.

In order that the operation may be more fully understood, I will describe briefly the details of this valve and its circuit-controlling devices, as shown in Fig. 7. A circular chamber, $e'$, has the receiving end of the air-supply pipe $i$ tapped into one side and the delivery end of the same pipe tapped into the opposite side. A waste-pipe, $e^2$, also opens from the side of the chamber into the atmosphere. A centrally-pivoted vibrating valve, $e^3$, serves to close the waste-pipe $e^2$ and the inlet end of the pipe $i$ alternately. Electro-magnets $e^4$ and $e^5$ have their poles projected through the walls of the chamber flush with its inner surface. Within the chamber, between the poles of the magnets, is a vibratory armature, $e^6$, extending across the chamber and pivoted centrally therein. A spring-actuated arm, $e^7$, is attached to one end of this armature and provided at its extremity with a roller, $e^8$, which rides on the back of the valve $e^3$. The armature is caused to vibrate by the excitation of the magnets $e^4$ and $e^5$ alternately, and as it moves to and fro the roller on its arm $e^8$ causes the valve $e^3$ to vibrate. When in one position, the waste-pipe $e^2$ is closed and the pipe $i$ opened, so that the air passes from the reservoir directly through to the expansion-chamber to open the waste-valve $c$ of the trap. When, however, the valve $e^3$ is turned to the opposite direction, it stops the influx of air from the reservoir and permits the air to recede from the expansion-chamber $h$ through the pipe $i$ and to escape through the waste-pipe $e^2$. The circuits through the respective magnets terminate in insulated contact-points $e^9$ and $e^{10}$. Conducting-fingers $e^{11}$ and $e^{12}$ on the ends of the armature make contact with these points alternately, completing the circuit through the body or frame of the valve. For a more detailed description of the valve and its operation reference is made to the Letters Patent before referred to.

In order to prevent the bursting of the trap by the formation of ice therein, I provide a second outlet-valve, $u$, adapted to open inward. The spindle of this valve is extended through a stuffing box or gland at the top of the chamber and encircled by a spring, $v$, which tends to hold the valve open. The spindle is provided with an enlarged head bearing against the under side of a flexible diaphragm, $w$, forming the lower wall of an expansion-chamber, $x$, which is at all times in free communication with the air-reservoir through a pipe, $y$, so that when the air-pressure is maintained the valve $u$ will remain closed. When, however, the air-supply ceases, so that the diaphragm $w$ is relieved from pressure, the valve is opened by the spring $v$ and held open, so that the accumulation of water within the trap is prevented.

Referring now to the form of trap represented in Figs. 8 and 9, it is, as regards the construction of the outlet-valve, the expansion-chamber for controlling the same, the electric switch, and its connections, identical with that represented in the preceding figures, the only difference between the two being that the thermostatic tube is replaced by a float, $z$, located in the water-chamber and provided with a rigid arm attached to the axis of the switch. When the water rises above the predetermined level, the float causes the switch to close the circuit and open the electric valve E, the effect of which is in turn to cause the opening of the valve $c$ and the discharge of the water in the manner before described. As the escape of the water proceeds, the float falls therewith, and finally acts to throw the switch into connection with conductor $o'$, thereby closing the electric valve and permitting the valve $c$ to close. It will be observed that this float is but a substitute or equivalent for the thermostatic device in the first form of the apparatus. In each case it is the rise of the water which effects the operation of the switch. When the float is used, the water will be discharged periodically, regardless of its temperature. When the thermostat is used, the water is retained until its temperature is greatly reduced, and thus the waste of heat is prevented. Either of these devices may be replaced by other suitable circuit opening and closing devices, such as are known in the art, adapted to be operated by the rise and fall of the water.

The valve $u$ may be applied to this second form of trap as well as to the first, if desired. It is to be distinctly understood, however, that the valve $u$ is not a necessary feature of my trap, that the trap is complete and operative without it, and that it may be omitted whenever it is so desired.

Having thus described my invention, what I claim is—

1. In a steam-trap, a water-receiving chamber provided with a drainage-valve, an electric circuit, and intermediate devices through which the circuit controls the drainage-valve, a circuit-controlling switch, and a switch-operating device, such as a thermostat or its described equivalent, located within the chamber subject to the rising and falling of the water therein.

2. In a steam-trap, the water-receiving chamber, its drainage-valve, the expansion-chamber connected with said valve and with an external source of fluid-pressure supply, an electric valve controlling the delivery of the fluid to and from the expansion-chamber, an electric circuit including said valve, a switch or circuit controlling device, and a thermostat or its described equivalent connected to and operating the switch and located within the receiving-chamber, whereby the water within the chamber is caused to bring into action power from an external source to operate the drainage-valve.

3. In a steam-trap, a water-receiving chamber and a drainage-valve therefor, a spring to close said valve, the expansion-chamber to open the valve, a pipe extending from the chamber to an external source of fluid-pressure supply, and a three-way valve located on said pipe.

4. In a steam-trap, the combination of a water-chamber provided with a discharge-valve for the water, an expansion-chamber, by which said valve is operated, a source of fluid-pressure supply, as a compressed-air reservoir, connected with the expansion-chamber, an electric valve controlling the delivery of the pressure-fluid to the expansion-chamber, an electric circuit embracing said electric valve, and a switch-controlling device, substantially as described, actuated by the rising water within the trap, whereby the water causes the electric current to actuate the electric valve and the latter causes the compressed air or other fluid to operate the outer valve of the trap.

5. A steam-trap provided with a self-opening drainage-valve having an expansion-chamber to open the same and a self-closing drainage-valve with an expansion-chamber to close the same, in combination with a source of constant fluid-pressure supply connected to the two expansion-chambers and a valve controlling the delivery of the fluid to the chamber of the self-closing valve, whereby the last-named valve may be caused to open and close at will, while the other is caused to open automatically only when the fluid-pressure fails, to the end that ice may not be formed within the apparatus.

6. In a steam-trap, a drainage-valve, an expansion-chamber, the electric three-way valve, through which said chamber is connected with a source of constant fluid-pressure supply, said valve provided with the switch for opening and closing its two operating-circuits $n'$ $o'$ alternately, the switch $l$, adjacent to the trap, for completing said circuits, and the thermostat or its described equivalent within the trap to actuate the switch.

In testimony whereof I hereunto set my hand, this 12th day of March, 1888, in the presence of two attesting witnesses.

WARREN S. JOHNSON.

Witnesses:
L. F. FISH,
E. W. CHUBB.